United States Patent [19]

King, Sr.

[11] 4,239,265

[45] Dec. 16, 1980

[54] ATTACHMENTS FOR PIPES

[76] Inventor: Lloyd H. King, Sr., 311 Blake Rd., Hopkins, Minn. 55343

[21] Appl. No.: 942,648

[22] Filed: Sep. 15, 1978

[51] Int. Cl.³ .............................................. F16L 41/04
[52] U.S. Cl. ................................................... 285/197
[58] Field of Search ............... 285/147, 198, 144, 373, 285/65, 73, 79, 81, 156, 419; 137/318, 319, 324, 325; 408/68

[56] References Cited

U.S. PATENT DOCUMENTS

| | | | |
|---|---|---|---|
| 1,705,049 | 3/1929 | Fournier | 408/68 |
| 2,972,915 | 2/1961 | Milonovits et al. | 137/318 |
| 3,643,986 | 2/1972 | Allan | 285/147 |
| 3,844,590 | 10/1974 | Burton | 285/147 |

Primary Examiner—Dave W. Arola
Attorney, Agent, or Firm—Jacobson and Johnson

[57] ABSTRACT

A self-sealing branch attachment for rigid or flexible tubing comprising a four part attachment having two self-mating members that assemble around a main tubing and an insert and seal that coact with the self-mating member to lock the attachment to the main tubing and provide a leakproof connection between the main tubing and the branch tubing.

2 Claims, 11 Drawing Figures

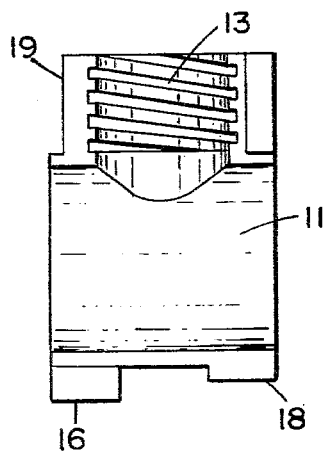
FIG. 1
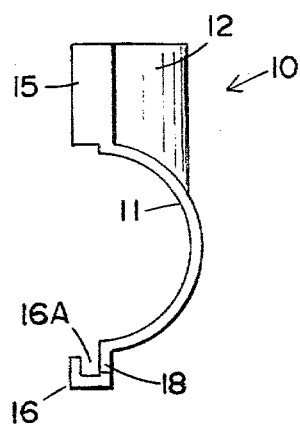
FIG. 2
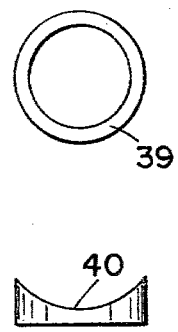
FIG. 4
FIG. 5
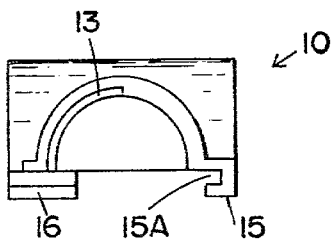
FIG. 3
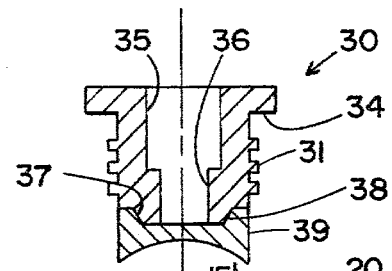
FIG. 6
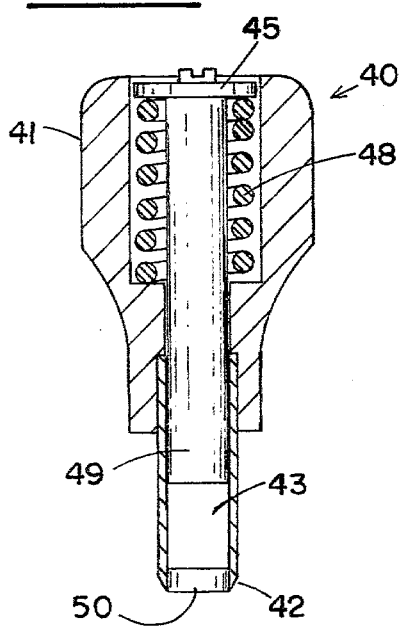
FIG. 7
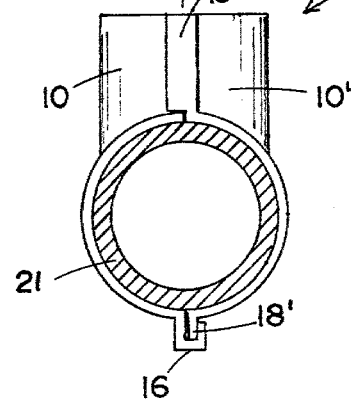
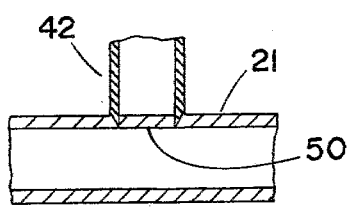
FIG. 10

ATTACHMENTS FOR PIPES

BACKGROUND OF THE INVENTION

1. Field of the Invention

This invention relates generally to attachments and, more specifically, to attachments for forming branch connections to either flexible or rigid tubing.

2. Description of the Prior Art

The concept of attachments such as Ts or elbows for flexible or rigid polymer tubing are well known in the art. Typical branching attachments include a T that is spliced into the main branch. Installation of the T requires cutting the main line and sealing the T to the cut edges of the main line. Another type of branch connector is a yoke-type connector, usually made out of metal, which fits around a portion of the pipe and holds the branch connector to the main line.

The present invention provides an attachment for flexible or rigid tubing which does not require severing the main line and needs a minimum of parts to self-lock and form a tight seal around the main line.

Summary of the Invention

Briefly, the present invention comprises two mating portions which lock together around a flexible or rigid tubing and an insert which fits into a threaded recess formed by the two mating members to securely lock the two mating portions around the main tubing. The present invention includes a seal which conforms to the outside of the main tubing and to the insert to provide a leakproof seal between the junction of the main tubing and the branch tubing.

Brief Description of the Drawing

FIG. 1 is a front view of the concave side of a portion of the mating connector;

FIG. 2 is an edge view of FIG. 1;

FIG. 3 is a top view of FIG. 1;

FIG. 4 is a top view of the sealing gasket;

FIG. 5 is an edge view of the sealing gasket;

FIG. 6 is a partially exploded view of the assembled mating portions, the branch connector insert and the sealing gasket;

FIG. 7 is a sectional view of a tool used to form an opening in the main line;

FIG. 10 is a sectional view of the hole forming operation; and

Description of the Preferred Embodiment

Figure 8:
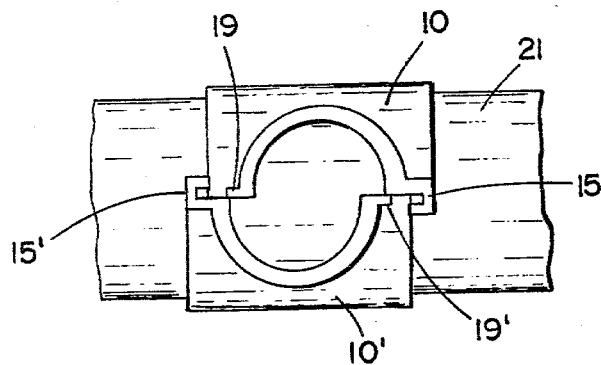
FIG. 8 is a top view of two partially assembled mating members.

Referring to the drawings, FIGS. 1, 2 and 3 show a self-mating member 10 having a concave side 11 for engaging a flexible or rigid tubing. Self-mating member 10 has an upward extending neck 12 having a set of square, double pitch threads 13 located on the concave side. In operation, two self-mating members are mated to each other, however, for purposes of description only one will be described. Located on the four corners of self-mating member 10 are lips or engaging means for holding two self-mating members in engagement with one another. Reference numeral 15 designates a first L-shaped lip having a slot 15a. Located diagonally opposite from L-shaped lip 15 is a second L-shaped lip 16 having a slot 16a. Lip 15 and lip 16 are located at right angles to one another with lip 15 having a vertical slot and lip 16a a horizontal slot. Located in the lower righthand corner of self-mating member 10 (as viewed in FIG. 1) is a first straight lip 18. Located diagonally opposite of straight lip 18 is a second straight lip 19. Lip 18 and lip 19 are located at right angles to one another with lip 19 having a vertical orientation and lip 18 a horizontal orientation. When two self-mating members are placed together, straight lip 18 and straight lip 19 fit snugly into the slots of L-shaped lip 15 and L-shaped lip 16 of a second mating member. That is, when two mating members 10 are mated together, lip 16 on one mating member locks over lip 18 on the other mating member and vice-versa. Similarly, straight lip 15 on one mating member locks over straight lip 19 on a second mating member and vice-versa. With the arrangement of straight and L-shaped lips, as shown on mating member 10, it is possible to axially slide the self-mating members along the main tubing until the self-mating members lock together as shown in FIG. 6.

Figure 9:
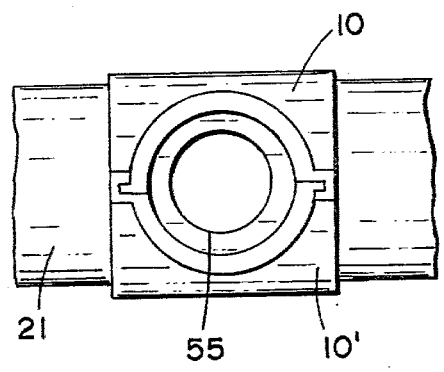
FIG. 9 is a top view of assembled mating members.

FIG. 8 shows two identical self-mating members identified by reference numerals 10 and 10' in a partially assembled position around a main tubing 21. To assemble member 10 and member 10' an operator axially slides member 10 and member 10' together. Note, lip 19 on member 10 slides into lip 15' on member 10' and lip 19' on member 10' slips into lip 15 on member 10. FIG. 9 shows mating members 10 and 10' fully assembled.

Each self-mating member 10 includes a double pitch thread surface. The double pitch thread allows two identical self-mating members 10 to be joined together and provide a continuous threaded recess for a threaded insert. However, any combinations of even pitch threads would be suitable.

Insert member 30 has central threaded openings 35 and 36. Typically, two different size threaded openings provide means for attaching different size pipe. However, more or less openings or other connectors could be used in insert 30.

FIG. 6 shows insert 30 containing square double pitch threads 31 which mate with the threaded recess formed by mating member 10 and 10'. In operation insert 30 is turned inward into threaded recess 30. Turning insert 30 into mating member 10 and 10' locks mating members 10 together, i.e., member 10 or member 10' can no longer be slid apart because insert 30 prevents axial movement while the lips prevent outward movement. Insert 30 provides an attachment for a branch pipe as well as a seal between the main line and the branch tubing. Insert 30 is frictionally held in the threaded recess formed by the coaction of the two mating members. It is envisioned that in some applications a locking spring could be attached to surface 36 to prevent insert 30 from working loose.

FIGS. 4, 5 and 6 show sealing gasket 39 comprised of neoprene rubber or the like. Sealing gasket 39 has a concave or arcuate lower section 40 for forming sealing engagement with the curved exterior surface of the main tubing. Typically, the radius of curvature of the arcuate surface of sealing gasket 39 is the same as the radius of curvature of the tubing it attaches to. The inside of gasket 39 (FIG. 6) reveals an outward diverging section 38 abutting against a converging section 37 located on insert 30. The purpose of the diverging section 38 and converging section 37 is to provide for radial outward expansion of gasket 39 when one forces gasket 39 against tubing 26.

FIG. 6 and FIG. 9 show two self-mating members 10 and 10′ engaging a main tubing 21. Note, lip 16 on one selfmating member 10 engages lip 18′ on self-mating member 10′. Similarly, lip 15 on self-mating member 10 engages lip 19′ on self-mating member 10′. In the assembled position the two self-mating members 10 and 10′ snugly and tightly form an enclosure around a main tubing 21. After member 10 and member 10′ are assembled around a main tubing, an opening can be cut in the main tubing with tool 40.

In order to provide an opening in main flexible tubing 21, FIG. 7 shows a cutting tool designated by reference numeral 40. Cutting tool 40 comprises a hand grip 41 on one end and a circular cutting edge 42 located on the opposite end. FIG. 10 shows tool 40 cutting through tubing 21. In operation a slight downward force together with a twisting of cutting edge 42 removes a plug 50 from tubing 21. Plug 50 lodges in the interior 43 of tool 46 (FIG. 7). To remove plug 50 from the interior of tool 46 the operator pushes plunger 45 downward causing shaft 49 to eject plug 50 from shaft 43. Spring 48 provides a restraining force to retract plunger 49 to the position shown in FIG. 7.

After opening 55 has been made in the tubing the insert member and gasket are positioned to lock and seal the branch attachment to the main tubing.

FIG. 6 shows insert 30 and gasket 39 in sectional view on top of mating member 10 and mating member 10′.

The radial outward expansion of sealing gasket 39 tightly expands sealing gasket 39 into sealing engagement with member 10, member 10′, tubing 21 and insert 30 to thereby provide a leakproof connection. In actual tests, main line pressures in excess of 120 psi have been effectively sealed.

The preferred embodiment shows two identical selfmating members that lock together around the mating tubing. It should be understood that with additional parts the self-mating members need not be identical. For example, if the units are pinned or bolted together it would not be necessary to have identical mating members.

Figure 11:
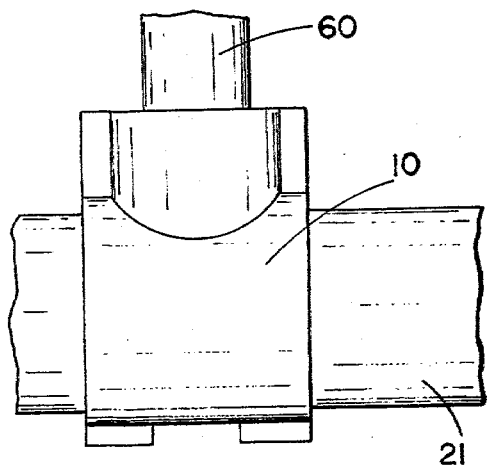
FIG. 11 shows the assembled branch connector on a main line.

FIG. 11 shows the assembled self-mating members with a branch pipe 60 extending from main line 21. In the entire operation it was unnecessary to either sever tubing 21 or to slip a fitting over the end of tubing 21. Consequently, the advantage of placing a branch line on an existing conduit is readily apparent.

I claim:

1. A branch connector for forming a branch line to a primary tubing without cutting of the primary tubing comprising:

a first mating member having a surface for engaging a portion of a primary tubing, said first mating member having a general rectangular shape with a first corner and a second corner located on one side of said surface for engaging a portion of the primary tubing and a third corner and a fourth corner located on the opposite side of said surface for engaging a portion of the primary tubing, a first lip located on said first corner, a second lip located on said second corner, a third lip located on said third corner and a fourth lip located on said fourth corner, said first mating member having a second surface thereon for engaging an insert;

a second mating member having a surface for engaging a further portion of the primary tubing, said second mating member having a general rectangular shape with a first corner and a second corner located on one side of said surface for engaging a further portion of the primary tubing and a third corner and a fourth corner located on the opposite side of said surface for engaging a further portion of the primary tubing, said second mating member having a first lip located on said first corner, a second lip located on said second corner, a third lip located on said third corner and a fourth lip located on said fourth corner;

said second mating member having a second surface thereon for engaging an insert;

said second surface of said first mating member having a threaded surface thereon and said second surface of said second mating member having a threaded surface thereon, each of said threaded surfaces having a thread thereon with at least a double pitch so that when said first mating member is assembled to said second mating member said lips on said first mating member and said lips on said second mating member coact to hold said first mating member to said second mating member to thereby produce a threaded recess operable for engaging a threaded insert; a threaded insert having threads having the same pitch as the threaded recess formed by coaction of said second surface of said first mating member and said second surface on said second mating member, said threaded insert operable for insertion into said threaded recess;

said first mating member and said second mating member operable for forming engagement to a primary tubing through coaction of said first lip, said second lip, said third lip and said fourth lip on said first mating member to said first lip, said second lip, said third lip and said fourth lip on said second mating member; whereby said mating members are identical and the coaction to produce said engagement is provided by sliding interaction of said lips on said first mating member with said lips on said second mating member.

2. A branch connector for forming a branch line to a primary tubing without cutting of the primary tubing comprising:

a first mating member having an arcuate surface for engaging a portion of the primary tubing, said first mating member having a first lip and a second lip located on one side of said arcuate surface and a third lip and a fourth lip located on the opposite side of said arcuate surface, said first mating member having a second surface thereon for engaging an insert;

a second mating member having an arcuate surface for engaging a further portion of the primary tubing, said second mating member having a first lip and a second lip located on one side of said arcuate surface and a third lip and a fourth lip located on the opposite side of said arcuate surface, said lips operable for engaging each other to thereby hold said first mating member to said second mating member;

said second mating member having a second surface thereon for engaging an insert;

said second surface of said first mating member having a threaded surface and said second surface of said second mating member having a threaded surface, whereby when said threaded surface of said first mating member is joined to said threaded surface of said second mating member said threaded surface on said first mating member and said threaded surface on said second mating member coact to produce a threaded recess having at least a double pitch thread therein operable for engaging a threaded insert;

a threaded insert for inserting into said threaded recess, said threaded insert operable to lock said first mating member to said second mating member; a bushing for positioning in said threaded recess, said bushing operable for forming a seal between the primary tubing and said threaded insert.

* * * * *